(12) United States Patent
Wu

(10) Patent No.: US 6,449,142 B1
(45) Date of Patent: Sep. 10, 2002

(54) KEYBOARD WITH PORTS

(76) Inventor: Donald Wu, 12F, No. 59, Chang Chun Rd., Taipei (TW)

(*) Notice: Subject to any disclaimer, the term of this patent is extended or adjusted under 35 U.S.C. 154(b) by 0 days.

(21) Appl. No.: 09/765,647

(22) Filed: Jan. 22, 2001

(51) Int. Cl.[7] .................................................. G06F 1/16
(52) U.S. Cl. ...................... 361/680; 361/379; 361/683; 361/686
(58) Field of Search ................................ 361/679, 680, 361/683, 686

(56) References Cited

U.S. PATENT DOCUMENTS 6,317,061 B1 * 11/2001 Batra et al. .................... 341/22

\* cited by examiner

Primary Examiner—Darren Schuberg
Assistant Examiner—Yean-Hsi Chang
(74) Attorney, Agent, or Firm—Bacon & Thomas

(57) ABSTRACT

A keyboard device includes a body containing a USB hub circuit and a keyboard circuit coupled to the hub circuit, a plurality of keys on the top of the body coupled to the keyboard circuit, a signal connection device on the body coupled to the hub circuit which is coupled to a first electronic device such that a key may be pressed to cause keyboard circuit to generate a signal which is sent to the first electronic device through the hub circuit and a signal connection device for processing, and at least one port on the body, each port having one end coupled to the hub circuit and the other end coupled to a second electronic device, such as a fingerprint reader, having an input section. When the second electronic device is coupled to the port, the input section of the second electronic device faces toward the user for ease of operation. Signals from the second electronic device may be sent to the first electronic device through the keyboard for processing. Further, signals from the first electronic device may be sent back to the second electronic device through the keyboard in response.

9 Claims, 5 Drawing Sheets

KEYBOARD WITH PORTS

FIELD OF THE INVENTION

The present invention relates to the field of computer keyboards and more particularly to a keyboard with ports having improved characteristics.

BACKGROUND OF THE INVENTION

A conventional computer configuration is illustrated in FIG. 1. As shown, computer 4 comprises a variety of ports 40 each having a specific interface specification (e.g., PS2 port, LPT port, 1394 port, or universal serial bus (USB) port) and a variety of peripherals 5 each having a unique connector 50 coupled to a corresponding port 40. Hence, signals from peripherals 5 may be sent to computer 4 for being processed. Also, signals from computer 4 may be sent back to peripherals 5 in response. Typically, in a non-USB configuration a specific driver must be installed in computer 4 when one of the peripherals 5 is first coupled to computer 4 as stated above. Then, computer 4 must be turned off prior to powering on computer 4 again. Finally, user may operate the newly connected peripheral 5 if the power-on test is passed. However, computer 4 may not be operated normally if that peripheral 5 is disconnected from computer 4. Further, the number of ports 40 may be not sufficient if there are many peripherals to be coupled to computer 4. Furthermore, computer 4 maybe operated abnormally. On the other hand, in a USB configuration, only an associate driver needs to be installed in computer 4 when the peripheral 5 having a USB connector is first coupled to computer 4. The user may operate the peripheral 5 immediately after the installation. Computer 4 may be still operated normally if that peripheral 5 is disconnected from computer 4. When user wants to use the peripheral 5, it may be coupled to computer 4 again without interrupting the normal operation of computer 4. It is a convenient design. Thus, such a USB connector is incorporated in almost all peripherals 5.

Another conventional keyboard 7 is illustrated in FIG. 2. As shown, keyboard 7 comprises a recessed socket 70 having a port therein coupled to a connector of an electronic device 8 and a connector 72 at the free end of keyboard cable such that signals from keyboard 7 maybe sent to computer 4 through connector 72. In both the peripheral 5 a conventional non-USB having connector as shown in FIG. 1 and the peripheral 5 having USB connector, two cables are employed to connect keyboard 7 and electronic device 8 to computer 4 and keyboard 7, respectively. Hence, a plurality of cables must be installed around computer 4 when a plurality of peripherals 5 are coupled to computer 4. It is known that there is little space available for the provision of such cables because most available space on and around the table is occupied by the computer, documents, or the like. Further, this may cause inconvenience and make the office messy. Furthermore, this is not a good working environment. Thus a need for improvement exists.

SUMMARY OF THE INVENTION

It is an object of the present invention to provide a keyboard comprising a body, a plurality of keys on the top surface of the body, and at least one port, and in which (i) the keyboard may be operated normally when the port of the keyboard is coupled to a first electronic device, and (ii) a signal communication therebetween is effected when a port of the keyboard is coupled to a second electronic device.

The above and other objects, features and advantages of the present invention will become apparent from the following detailed description taken with the accompanying drawings.

DETAILED DESCRIPTION OF THE PREFERRED EMBODIMENTS

Figure 1:
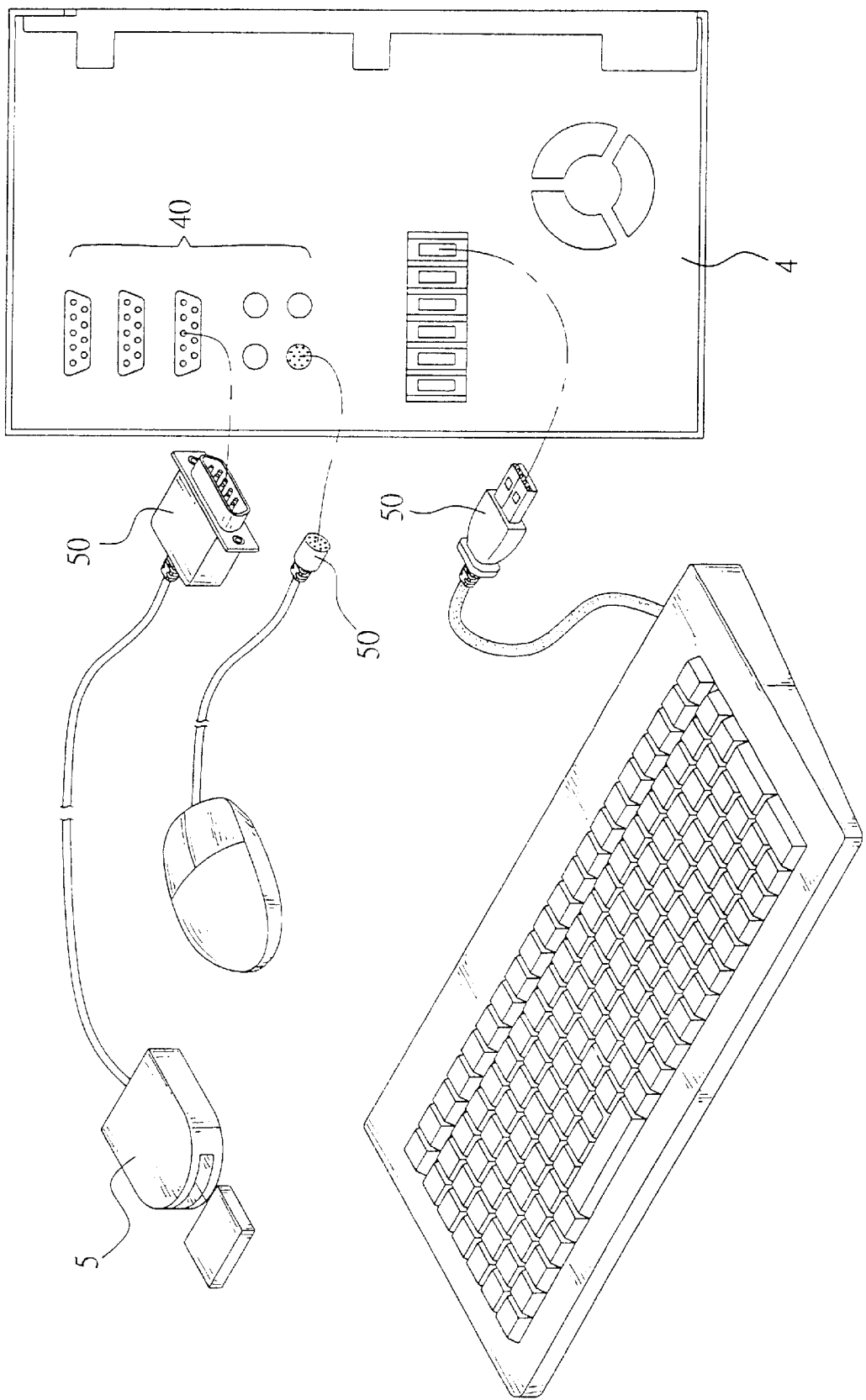
FIG. 1 schematically shows a conventional keyboard coupled to a computer.
Figure 2:
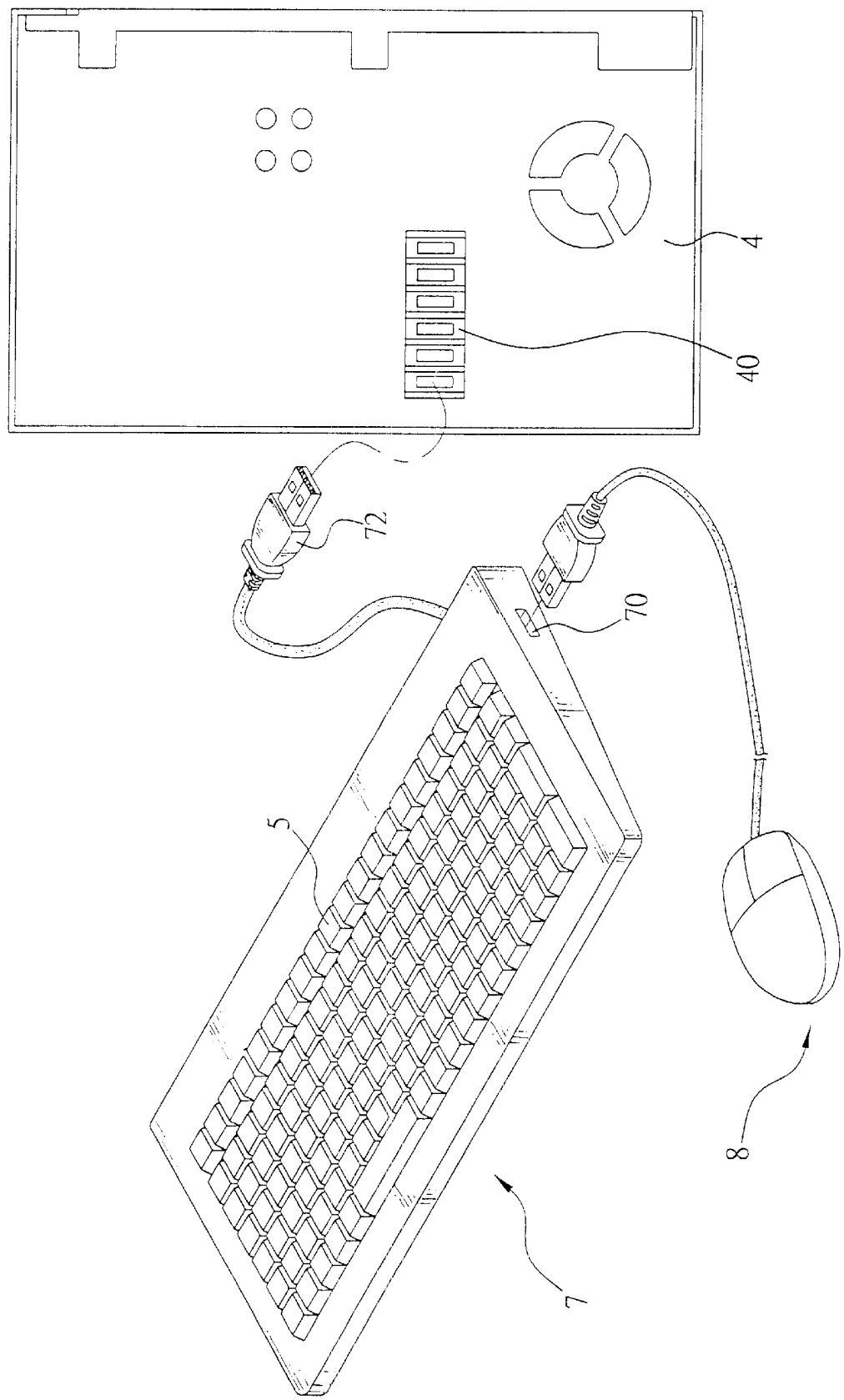
FIG. 2 schematically shows another conventional keyboard coupled to a computer.
Figure 3:
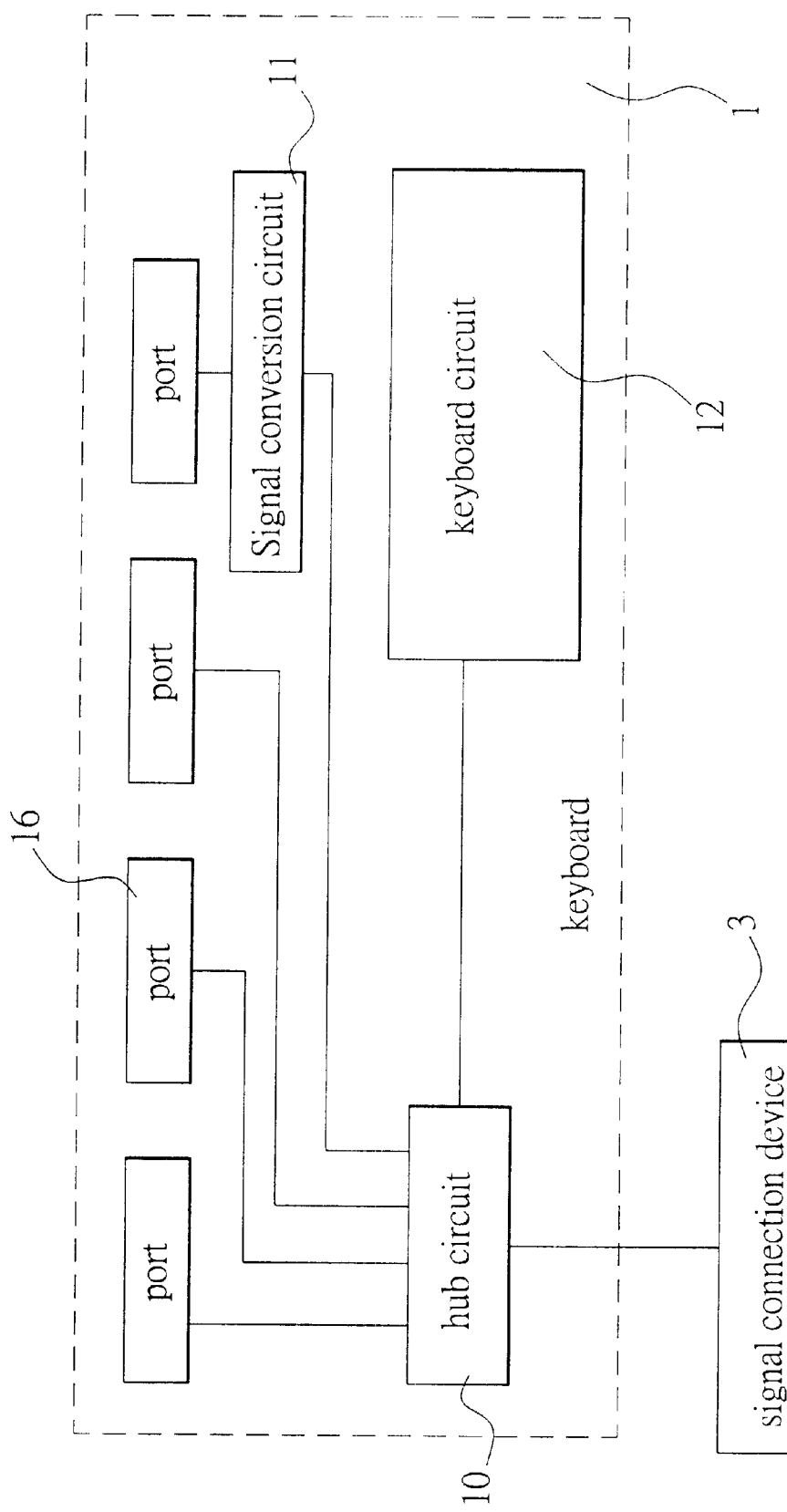
FIG. 3 is a block diagram schematically showing major components of a keyboard according to the invention.
Figure 4:
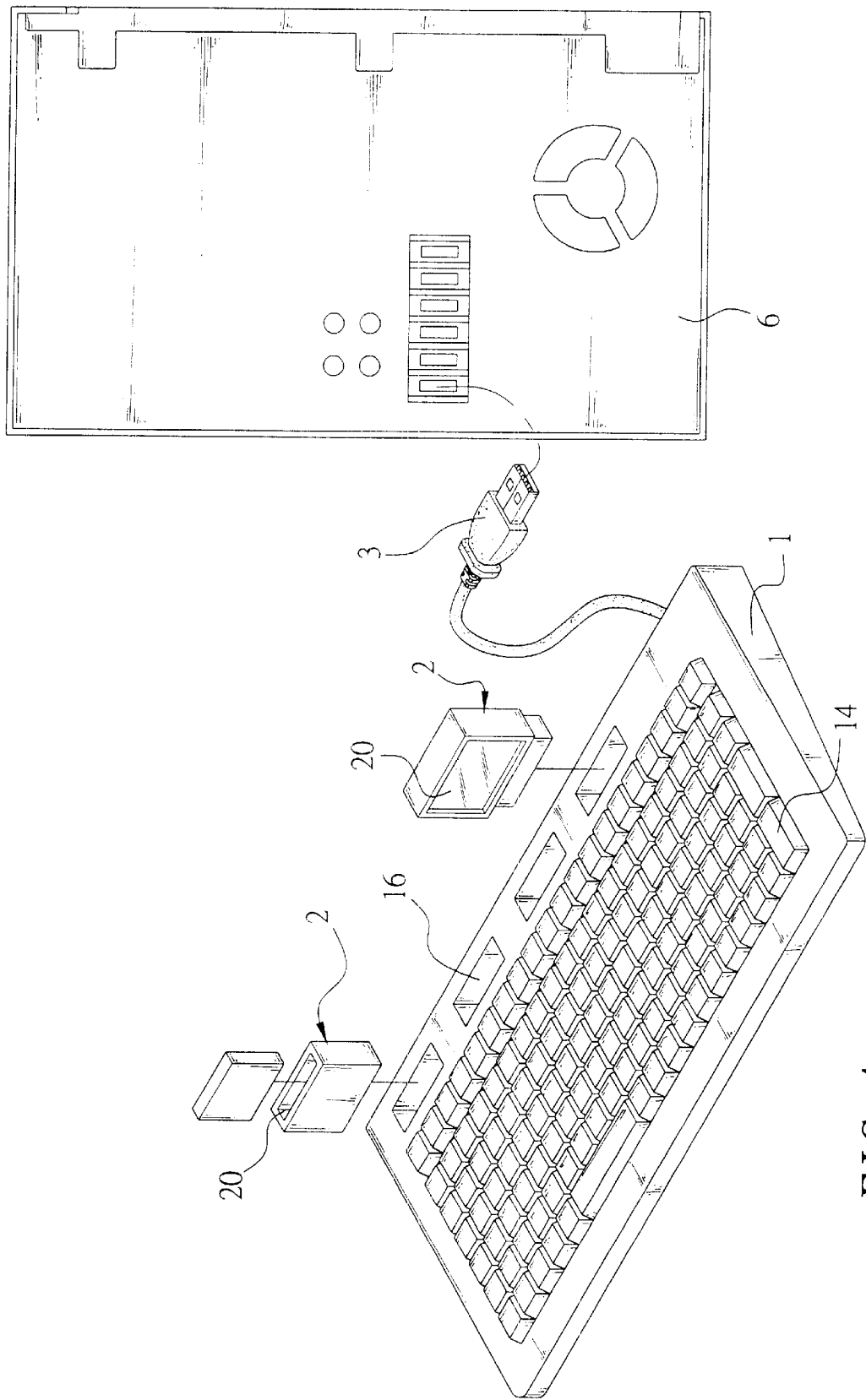
FIG. 4 schematically shows a first preferred embodiment of keyboard according to the invention coupled to a computer.
Figure 5:
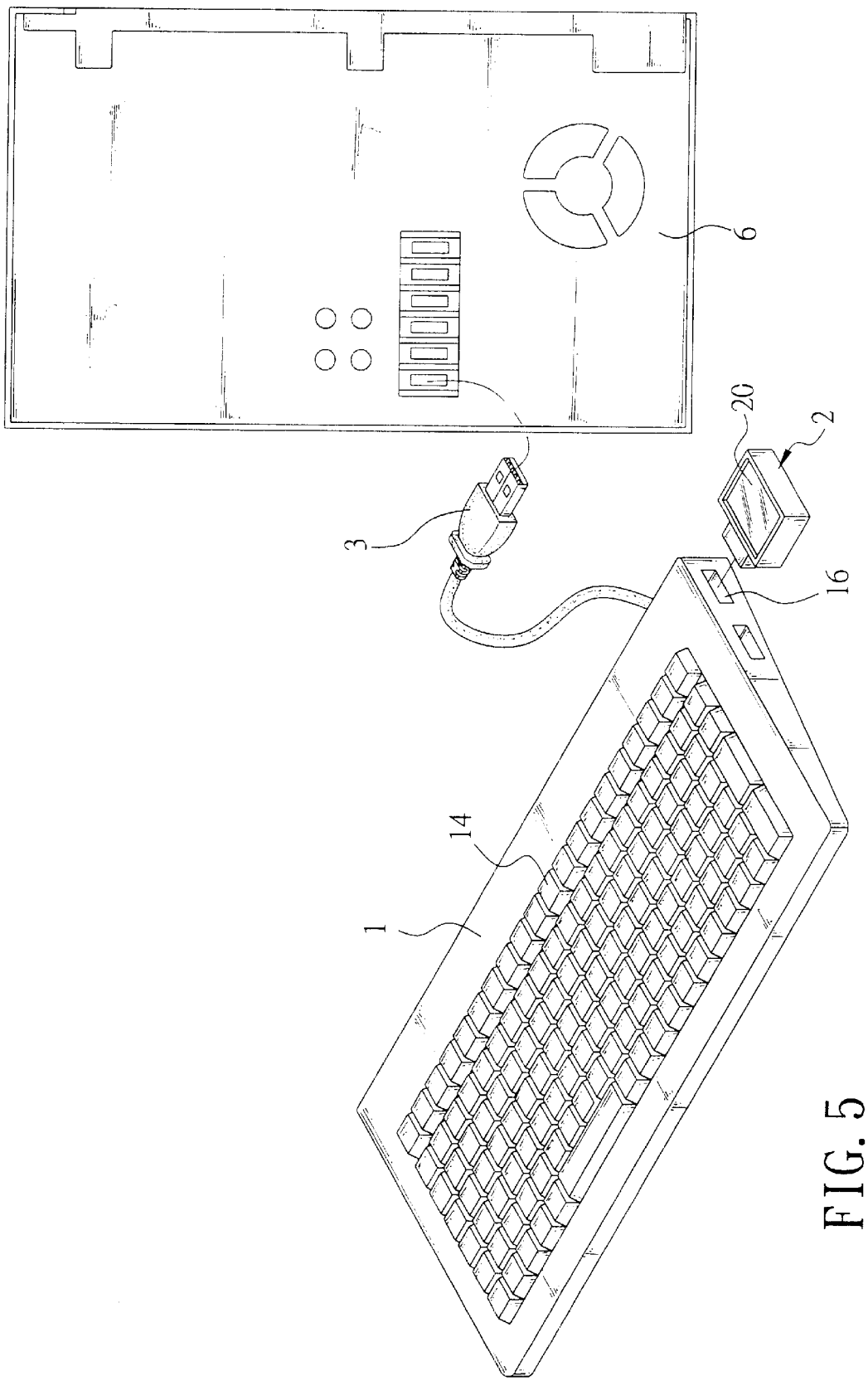
FIG. 5 schematically shows a second preferred embodiment of keyboard according to the invention coupled to a computer.

Referring to FIGS. 3 through 5, there is shown a keyboard in accordance with the invention comprising a body 1 including a hub circuit 10, a keyboard circuit 12 coupled to hub circuit 10, and a plurality of keys 14 on the top surface of the body 1 being coupled to keyboard circuit 12, and a signal connection device 3 having one end coupled to hub circuit 10 and the other end coupled to a first electronic device 6. Hence, the keyboard may be coupled to first electronic device 6 through signal connection device 3. In an embodiment of this invention, the first electronic device 6 is a computer, while it is appreciated by those skilled in the art that computer maybe replaced by another suitable device without departing from the scope and spirit of the invention. In operation, key 14 may be pressed to generate a signal from keyboard circuit 12. Then the signal is sent to first electronic device 6 through hub circuit 10 and signal connection device 3 for being processed by a conventional technique. Further, at least one port 16 is provided at body 1. Each port 16 receives a second electronic device 2 and electronically couples it to hub circuit 10. In the embodiment, the second electronic device 2 is a fingerprint identifier, an image fetching device, a credit card reader, or a memory reader, while it is appreciated by those skilled in the art that any of above devices may be replaced by another suitable device without departing from the scope and spirit of the invention. As such, the input means of second electronic device 2 is positioned to face the user for ease of operation after second electronic device 2 is coupled to port 16 (FIGS. 4 and 5). Hence, signals from second electronic device 2 may be sent to first electronic device 6 through the keyboard for being processed. Also, signals from first electronic device 6 may be sent back to second electronic device 2 through the keyboard in response.

It will be understood by those skilled in the art that a first electronic device having a USB connector is readily adapted to couple to a second electronic device having a USB port. Thus, the operation is convenient. Further, the second electronic device having a USB port may be expanded to accommodate 127 USB connectors through a plurality of universal serial bus hubs (USB Hub). Thus, it is impossible for the second electronic device to have insufficient connectors when coupled to the first electronic device having an incorporated USB connector.

In a first preferred embodiment of the invention as shown in FIG. 4, the hub circuit 10 is a USB hub circuit and each of ports 16 is a USB port. Hence, any of second electronic devices 2 having such USB port may be directly coupled to a USB connector. The USB connector of the second electronic device 2 is provided on a predetermined position thereon. Hence, the input means of second electronic device 2 faces the user for ease of operation after second electronic device 2 is coupled to the USB port. As shown, the predetermined position of USB port is on the same surface as keys of keyboard. This configuration is suitable to permit a compact electronic device having signal transmission capability to be inserted onto port of keyboard. Thus a keyboard incorporating such electronic device may facilitate signal input. Further, the drawbacks of messy cables and space consumption that occur in prior art are eliminated.

In a second preferred embodiment of the invention as shown in FIG. 5, hub circuit 10 is a USB hub circuit and each of ports 16 is a port having a specific interface specification. A signal conversion circuit 11 is coupled between the USB hub circuit and specific ports. Hence, any of second electronic devices 2 having such a specific connector may be directly coupled to a port having a corresponding specific interface specification. A signal generated from second electronic device 2 is sent to the signal conversion circuit for conversion into a USB signal through the specific connector of second electronic device 2 and the coupled corresponding specific port of the keyboard. The converted signal is sent to first electronic device 6 for being processed through signal connection device 3. As shown, the specific connector of the second electronic device 2 is provided at a predetermined position thereon. Hence, the input means 20 of second electronic device 2 faces the user for ease of operation after second electronic device 2 is coupled to a USB port. The predetermined position of the USB port is on the same surface as keys of keyboard. This configuration is suitable for inputting signals from second electronic device 2. Further, the drawbacks of messy cables and space consumption that occur in the prior art are eliminated. In the invention, signal connection device 3 is a cable having one end coupled to hub circuit and the other end coupled to a port which is a USB port, although it is to be appreciated by those skilled in the art that the USB port may be replaced by another suitable means without departing from the scope and spirit of the invention. Moreover, a connector of second electronic device 2 is coupled to the USB port.

Referring to FIG. 5 again, the second preferred embodiment of the invention is shown for illustrating the effect achieved by the invention. As shown, the keyboard is coupled to computer 6 through signal connection device 3. A second electronic device including a fingerprint fetching device which serves as input means 20 is inserted in port 16 of the keyboard. The fingerprint fetching device is provided substantially in the same plane as keys 14. The finger of a person is first placed on fingerprint fetching device. Then fingerprint fetching device is activated to fetch a fingerprint from the finger. The fetched fingerprint data is then sent to computer 6 for comparing with data in a fingerprint data base through fingerprint identifier 2, port 16, hub circuit 10, and signal connection device 3.

While the invention has been described by means of specific embodiments, numerous modifications and variations could be made thereto by those skilled in the art without departing from the scope and spirit of the invention set forth in the claims.

What is claimed is:

1. A keyboard device comprising:

a body including a universal serial bus (USB) hub circuit and a keyboard circuit coupled to said USB hub circuit, and a plurality of keys on a top surface of said body electrically coupled to said keyboard circuit;

a signal connection device coupled to said USB hub circuit and to a first electronic device such that when said key is pressed, said keyboard circuit generates a signal which is sent to said first electronic device through said USB hub circuit and said signal connection device for being processed; a second electronic device having an input device; and at least one port on said body, said at least one port being arranged to electrically couple the second electronic device to said hub circuit, said second electronic device being received in said port to thereby position said second electronic device on said body and facilitate use of the second electronic device by a user without the need for connecting cables;

whereby signals input through said second electronic device are sent to said first electronic device through said body for being processed by said first electronic device and signals from said first electronic device are sent back to said second electronic device through said body in response.

2. The keyboard device of claim 1, wherein said at least one port is a USB port, and said second electronic device further comprises a USB connector.

3. The keyboard device of claim 2, wherein said USB connector of said second electronic device is provided at a predetermined positioned thereon such that said input device of said second electronic device is positioned to facilitate access by the user after said second electronic device is coupled to said USB port.

4. The keyboard device of claim 1, wherein said at least one port has a predetermined interface specification, and further comprising a signal conversion circuit coupled between said USB hub circuit and said port having said predetermine interface specification such that said second electronic device is coupled to said port with said predetermined interface specification, whereby said signals input through said second electronic device are sent to said signal conversion circuit for conversion into a USB signal so that said signals input through said second electronic device may be sent through said hub circuit and said signal connection device to said first electronic device.

5. The keyboard device of claim 4, wherein said second electronic device includes a connector provided at a predetermined position thereon such that said input device of said second electronic device is positioned to facilitate access by the user after said second electronic device is coupled to said port having said predetermined interface specification.

6. The keyboard device of claim 1, wherein signal connection device is a cable having one end coupled to said hub circuit and another end coupled to said first electronic device.

7. The keyboard device of claim 1, wherein said first electronic device is a computer.

8. The keyboard device of claim 1, wherein said second electronic device is positioned by said port to face said user.

9. The keyboard device of claim 1, 3, or 5, wherein said second electronic device is a fingerprint reader, and said input device of said second electronic means is positioned by said port so that a surface of said input means is in substantially a same plane as that of said keys.

* * * * *